(12) United States Patent
Iwata et al.

(10) Patent No.: US 10,639,736 B2
(45) Date of Patent: May 5, 2020

(54) CERAMIC-METAL STRUCTURE

(71) Applicant: NGK SPARK PLUG CO., LTD., Nagoya-shi, Aichi (JP)

(72) Inventors: Muneyuki Iwata, Kasugai (JP); Yoshiaki Nagaya, Komaki (JP); Toshikazu Horio, Kasugai (JP); Shigeyuki Yamamoto, Kitanagoya (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 0 days.

(21) Appl. No.: 16/302,758

(22) PCT Filed: Jul. 14, 2017

(86) PCT No.: PCT/JP2017/025642
§ 371 (c)(1),
(2) Date: Nov. 19, 2018

(87) PCT Pub. No.: WO2018/016423
PCT Pub. Date: Jan. 25, 2018

(65) Prior Publication Data
US 2019/0126373 A1    May 2, 2019

(30) Foreign Application Priority Data
Jul. 19, 2016   (JP) .................................. 2016-141502

(51) Int. Cl.
*B23K 1/14*     (2006.01)
*B23K 1/19*     (2006.01)
(Continued)

(52) U.S. Cl.
CPC .................. *B23K 1/14* (2013.01); *B23K 1/18* (2013.01); *B23K 1/19* (2013.01); *C04B 37/02* (2013.01);
(Continued)

(58) Field of Classification Search
CPC ........ Y10T 428/218; Y10T 428/24331; B23K 1/14; B23K 1/18; B23K 1/19;
(Continued)

(56) References Cited

U.S. PATENT DOCUMENTS

| 2001/0015491 A1 | 8/2001 | Shiraishi |
| 2011/0176286 A1 | 7/2011 | Nakajima et al. |
| 2015/0160086 A1 | 6/2015 | Ponath et al. |

FOREIGN PATENT DOCUMENTS

| JP | 5-277721 A | 10/1993 |
| JP | 2002-254166 A | 9/2002 |

(Continued)

OTHER PUBLICATIONS

International Search Report (PCT/ISA/210) dated Aug. 29, 2017 issued by the International Searching Authority in International Application No. PCT/JP2017/025642.

(Continued)

*Primary Examiner* — Alexander S Thomas
(74) *Attorney, Agent, or Firm* — Sughrue Mion, PLLC

(57) ABSTRACT

A ceramic-metal structure in which a metallic body (2) is inserted into or disposed above a through hole (4h) of a ceramic substrate (4) and which includes an annular pad layer (6) disposed around the through hole; an annular ring member (8) joined to the pad layer via a first brazing filler portion (10) and having a coefficient of thermal expansion smaller than that of the metallic body; a second brazing filler portion (12) intervening between the ring member and metallic body; and brazing filler flow prevention layers (7a, 7b) covering an outer surface of the pad layer so as to expose a central region (6c) of the outer surface of the pad layer facing the first brazing filler portion. The first brazing filler (Continued)

portion joins the central region and the ring member without projecting to a radially inner or outer side of the flow prevention layers.

5 Claims, 3 Drawing Sheets

(51) Int. Cl.
  *C04B 37/02* (2006.01)
  *B23K 1/18* (2006.01)
  *B23K 103/00* (2006.01)
  *B23K 103/04* (2006.01)

(52) U.S. Cl.
  CPC ........ *C04B 37/023* (2013.01); *B23K 2103/05* (2018.08); *B23K 2103/52* (2018.08); *C04B 2237/064* (2013.01); *C04B 2237/122* (2013.01); *C04B 2237/124* (2013.01); *C04B 2237/125* (2013.01); *C04B 2237/343* (2013.01); *C04B 2237/406* (2013.01); *C04B 2237/62* (2013.01); *C04B 2237/68* (2013.01); *C04B 2237/72* (2013.01); *C04B 2237/74* (2013.01); *C04B 2237/765* (2013.01); *C04B 2237/80* (2013.01); *C04B 2237/86* (2013.01); *Y10T 428/218* (2015.01); *Y10T 428/24331* (2015.01)

(58) Field of Classification Search
  CPC ............ B23K 2103/05; B23K 2103/52; H05K 2201/10138; H05K 3/3426; C04B 37/02; C04B 37/023; C04B 2237/064; C04B 2237/122; C04B 2237/124; C04B 2237/125; C04B 2237/343; C04B 2237/62; C04B 2237/68; C04B 2237/80
  See application file for complete search history.

(56) References Cited

FOREIGN PATENT DOCUMENTS

| | | |
|---|---|---|
| JP | 2003-17614 A | 1/2003 |
| JP | 3378550 B2 | 2/2003 |
| JP | 2011-151180 A | 8/2011 |
| JP | 5116614 B2 | 1/2013 |

OTHER PUBLICATIONS

Office Action dated Feb. 19, 2020, issued by the European Patent Office in counterpart European Patent Application No. 17830942.3.

CERAMIC-METAL STRUCTURE

CROSS REFERENCE TO RELATED APPLICATIONS

This application is a National Stage of International Application No. PCT/JP2017/025642 filed Jul. 14, 2017, claiming priority based on Japanese Patent Application No. 2016-141502 filed Jul. 19, 2016.

TECHNICAL FIELD

The present invention relates to a ceramic-metal structure in which a ceramic and a metal are brazed together.

BACKGROUND ART

According to a conventionally known technique, example, a flange made of Kovar is brazed to a ceramic, and a pipe member made of a metal is connected to the flange 2 from inside by means of silver solder (Patent Document 1).

According to this technique, the pipe member has a circumferential groove formed at an end portion thereof. The groove obstructs a flow of a molten silver solder so as to prevent flow of the molten silver solder into unnecessary portions, whereby the molten silver solder can be concentrated at a brazing zone for firm brazing.

PRIOR ART DOCUMENT

Patent Document

Patent Document 1: Japanese Patent Application Laid-Open (kokai) No. H05-277721

SUMMARY OF THE INVENTION

Problem to be Solved by the Invention

Incidentally, if brazing is performed with a brazing filler metal in direct contact with a ceramic, due to a difference in a coefficient of thermal expansion between the ceramic and the brazing filler metal, stress concentrates at a brazed portion during cooling, potentially resulting in separation of the brazing filler. Even if brazing is performed with a brazing filler metal in indirect contact with a ceramic, stress concentrates in the vicinity of an interface between the ceramic and a metallization metal, potentially resulting in occurrence of cracking in the ceramic.

In view of the above, an object of the present invention is to provide a ceramic-metal structure in which, during cooling, there are restrained separation of a brazing filler and occurrence of cracking in a ceramic substrate so as to ensure reliable brazing.

Means for Solving the Problem

In order to solve the above problem, the present invention provides a ceramic-metal structure in which a pipe-shaped or rod-shaped metallic body is inserted into a through hole extending through a ceramic substrate from a surface of the ceramic substrate in a thickness direction thereof or is coaxially disposed just above the through hole, the ceramic-metal structure comprising an annular pad layer made of a metal and disposed on the surface of the ceramic substrate to be located around the through hole; an annular ring member joined to the pad layer via a first brazing filler portion and having a coefficient of thermal expansion smaller than that of the metallic body; a second brazing filler portion intervening between the ring member and the metallic body and joining the ring member and the metallic body together; and a brazing filler flow prevention layer which covers an outer surface of the pad layer in such a manner as to expose a central region of an upper surface of the outer surface of the pad layer, the upper surface facing the first brazing filler portion, wherein the first brazing filler portion joins the central region and the ring member together without projecting to a radially inner side and a radially outer side of the brazing filler flow prevention layer.

According to the present ceramic-metal structure, since the first brazing filler portion does not project to the radially inner side and the radially outer side of the brazing filler flow prevention layer, direct contact of the first brazing filler portion with the ceramic substrate can be prevented. As a result, there can be restrained separation of the first brazing filler portion which could otherwise result from concentration of stress at the first brazing filler portion during cooling due to a difference in coefficient of thermal expansion between the ceramic substrate and the first brazing filler portion.

Also, as a result of the brazing filler flow prevention layer covering the outer surface of the pad layer in such a manner as to expose the central region of the pad layer's upper surface facing the first brazing filler portion, the brazing filler flow prevention layer is formed in contact with a surface of the ceramic substrate while covering an inner circumferential surface and an outer circumferential surface of the pad layer disposed on the surface of the ceramic substrate. Accordingly, the brazing filler flow prevention layer is disposed above the interface between the ceramic substrate and the metal pad layer on which stress is imposed most intensively, to thereby improve the strength of the ceramic substrate. Further, as a result of an end portion of the first brazing filler portion being located internally of the interface, stress imposed on the interface is mitigated. As a result, occurrence of cracking in the ceramic substrate is restrained, whereby reliable brazing is ensured.

The ceramic-metal structure of the present invention may be configured such that the ring member has an outer diameter smaller than that of the pad layer and such that the first brazing filler portion has a portion which is in contact with a peripheral surface of the ring member and forms a fillet shape.

In the case of the first brazing filler portion having a portion in a fillet shape (a concave shape), the fillet shape indicates that a molten brazing filler metal has penetrated into a space between the ring member and the pad layer with sufficient wettability to thereby improve brazing strength.

The ceramic-metal structure of the present invention may be configured such that the first brazing filler portion has a portion which extends toward a radially inner side of the ring member and forms a fillet shape.

As a result of the portion also forming a fillet shape, brazing strength is improved.

The ceramic-metal structure of the present invention may be configured such that the ceramic substrate and the brazing filler flow prevention layer contain the same material as their main components.

According to the present ceramic-metal structure, since the ceramic substrate and the brazing filler flow prevention layer contain the same material as their main components, adhesion between the ceramic substrate and the brazing filler flow prevention layer is excellent.

The ceramic-metal structure of the present invention may be configured such that: the ceramic substrate has a flow channel formed therein which is connected to the through hole and through which gas flows, the metallic body is pipe-shaped, and exchange of gas can be performed between the flow channel and the outside of the ceramic substrate through an internal space of the metallic body.

According to the present ceramic-metal structure, since the ceramic substrate and the metallic body are reliably brazed together, in introducing gas into or discharging gas from the flow channel formed in the ceramic substrate through the pipe-shaped metallic body, leakage of gas from a brazed portion can be restrained to thereby allow stable exchange of gas.

Effects of the Invention

The present invention can provide a ceramic-metal structure in which, during cooling, there are restrained separation of a brazing filler (a first brazing filler portion) and occurrence of cracking in a ceramic substrate so as to ensure reliable brazing.

MODES FOR CARRYING OUT THE INVENTION

Figure 1:
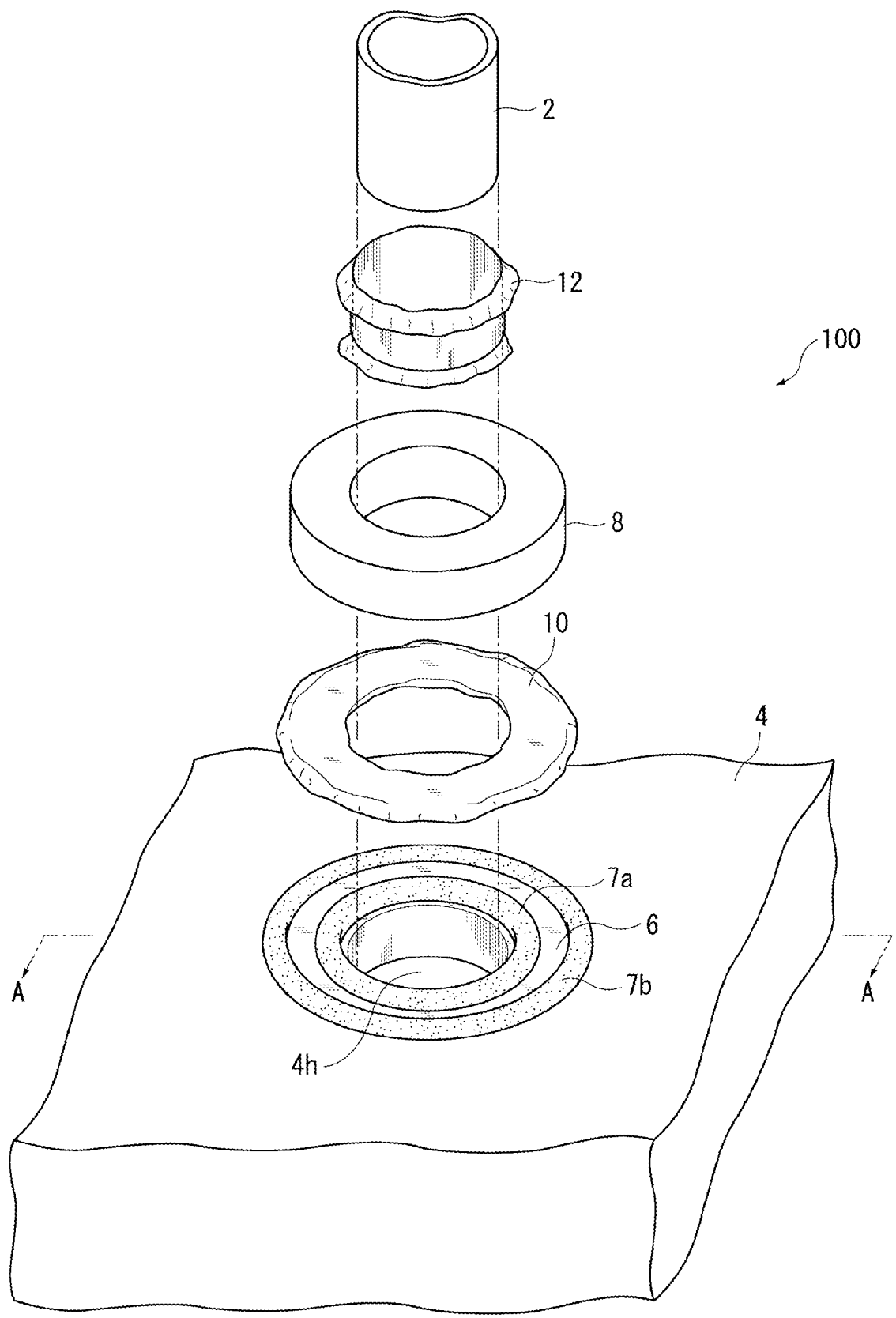
FIG. 1 Exploded perspective view of a ceramic-metal structure according to an embodiment of the present invention.
Figure 2:
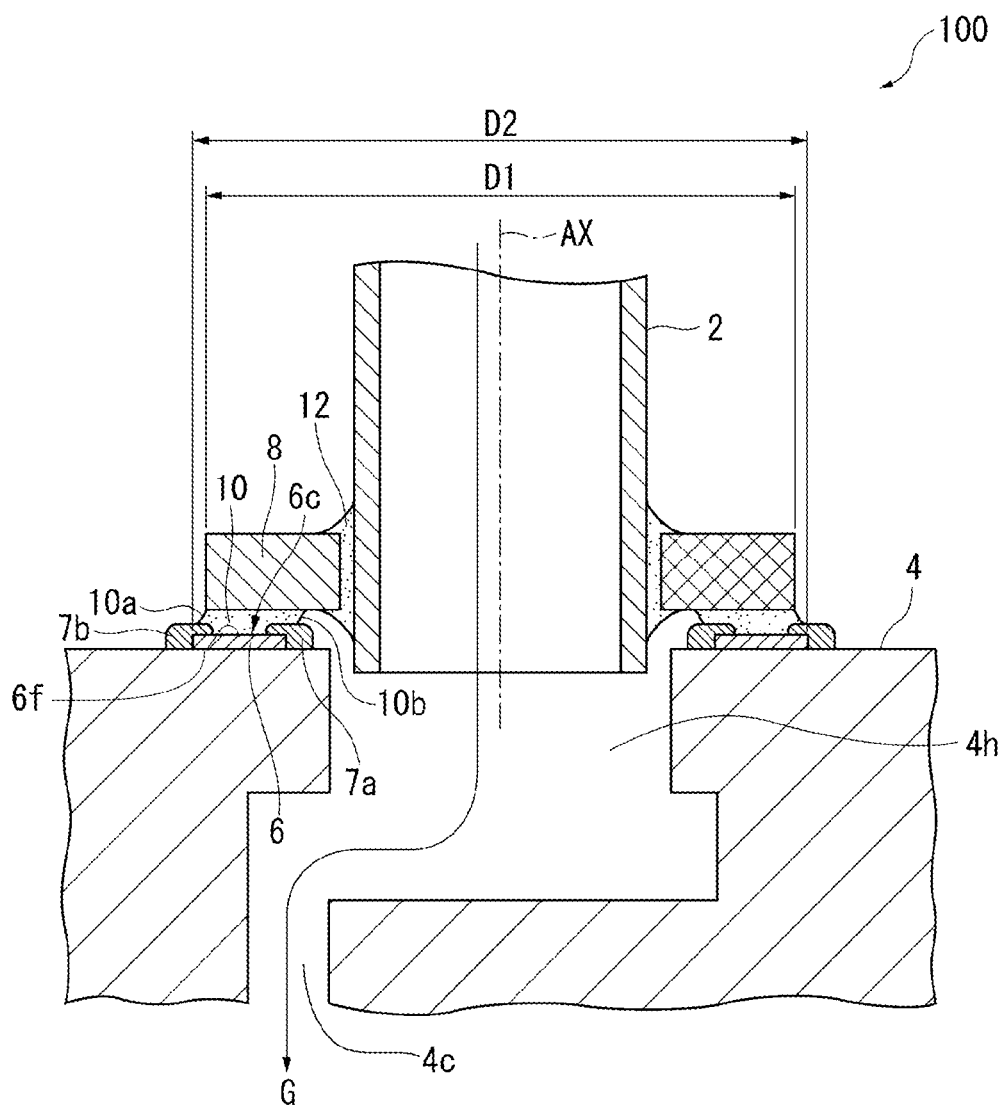
FIG. 2 Sectional view taken along line A—A of FIG. 1.

The present invention will next be described in detail with reference to the drawings. FIG. 1 is an exploded perspective view of a ceramic-metal structure 100 according to an embodiment of the present invention, and FIG. 2 is a sectional view taken along line A—A of FIG. 1.

In FIG. 1, the ceramic-metal structure 100 includes a pipe-shaped metallic body 2, a generally quadrate ceramic substrate 4 having a through hole 4h, a pad layer 6 disposed on a surface of the ceramic substrate 4 around the through hole 4h, brazing filler flow prevention layers 7a and 7b to be described in detail later, an annular ring member 8, a first brazing filler portion 10 joining the pad layer 6 and the ring member 8 together, and a second brazing filler portion 12 joining the ring member 8 and the metallic body 2 together.

The ceramic substrate 4 is a ceramic sintered body which predominantly contains alumina, and the metallic body 2 is formed of stainless steel. The annular pad layer 6 is made of a metal, enhances adhesion between the ceramic substrate 4 and the first brazing filler portion 10, and prevents direct brazing of the first brazing filler portion 10 to the ceramic substrate 4. The pad layer 6 can be formed as follows: a paste which contains, for example, at least one of tungsten and molybdenum as a main component is printed onto a surface of a green body of the ceramic substrate 4, followed by firing and subsequent Ni plating onto the surface of the fired paste.

The brazing filler flow prevention layers 7a and 7b can be formed as follows: a paste of, for example, a material whose main component (alumina in the present embodiment) is the same as that of the ceramic substrate 4 is printed annularly in a bridging manner (to extend) between green bodies of the ceramic substrate 4 and the pad layer 6, followed by simultaneous firing together with the green bodies of the ceramic substrate 4 and the pad layer 6.

The ring member 8 is formed of, for example, Kovar having a coefficient of thermal expansion smaller than that of the metallic body 2.

Examples of a brazing filler metal which is to form the first brazing filler portion 10 and the second brazing filler portion 12 include an Au—Cu alloy, an Ag—Cu alloy, and various conductive materials (e.g., Cu (copper) and Ag (silver)).

The ceramic substrate 4 has a flow channel 4c (see FIG. 2) formed therein and communicating with the through hole 4h, whereby exchange of gas G can be performed between the flow channel 4c and the outside of the ceramic substrate 4 through an internal space of the metallic body 2. Notably, in an internal space of the ceramic substrate 4, a predetermined processing (e.g., heating) can be performed on the gas G, or the concentration of the gas G can be detected.

As shown in FIG. 2, the metallic body 2 is inserted into the through hole 4h extending through the ceramic substrate 4 in a thickness direction thereof and is disposed coaxially with an axis AX of the through hole 4h.

The brazing filler flow prevention layers 7a and 7b cover an outer surface of the pad layer 6 in such a manner as to expose a central region 6c of an upper surface of the outer surface of the pad layer 6, the upper surface facing the first brazing filler portion 10. Specifically, the annular inner brazing filler flow prevention layer 7a is formed in a bridging manner between the ceramic substrate 4 and a radially inner circumferential edge of the pad layer 6 such that the annular inner brazing filler flow prevention layer 7a rises above an upper surface 6f of the pad layer 6. The inner brazing filler flow prevention layer 7a is formed in contact with the surface of the ceramic substrate 4 while covering the inner circumferential surface of the pad layer 6.

Similarly, the annular outer brazing filler flow prevention layer 7b is formed in a bridging manner between the ceramic substrate 4 and a radially outer circumferential edge of the pad layer 6 such that the annular outer brazing filler flow prevention layer 7b rises above the upper surface 6f of the pad layer 6. The outer brazing filler flow prevention layer 7b is formed in contact with the surface of the ceramic substrate 4 while covering the outer circumferential surface of the pad layer 6.

The first brazing filler portion 10 intervenes between and brazes together the central region 6c of the pad layer 6 and the ring member 8 without projecting to the radially inner side of the inner brazing filler flow prevention layer 7a and to the radially outer side of the outer brazing filler flow prevention layer 7b.

Meanwhile, the second brazing filler portion 12 intervenes between and brazes together the ring member 8 and the metallic body 2.

Since the first brazing filler portion 10 does not project to the radially inner side and the radially outer side of the brazing filler flow prevention layers 7a and 7b, respectively, direct contact of the first brazing filler portion 10 with the ceramic substrate 4 can be prevented. Also, as a result of the brazing filler flow prevention layers 7a and 7b being disposed above the interface between the ceramic substrate 4 and the metal pad layer 6 on which stress is imposed most intensively, the strength of the ceramic substrate is improved. Further, as a result of an end portion of the first brazing filler portion 10 being located internally of the interface, stress imposed on the interface is mitigated. As a result, there can be restrained separation of the first brazing filler portion 10 and occurrence of cracking in the ceramic substrate 4 which could otherwise result from concentration of stress at the first brazing filler portion 10 during cooling due to a difference in coefficient of thermal expansion between the ceramic substrate 4 and the first brazing filler portion 10, whereby reliable brazing can be ensured.

According to the present embodiment, an outer diameter D1 of the ring member 8 is smaller than an outer diameter D2 of the pad layer 6, and the first brazing filler portion 10 has a portion 10a which forms a fillet shape and is in contact with the outer circumferential surface of the ring member 8. In the case of the first brazing filler portion 10 having the portion 10a in a fillet shape (a concave shape), the fillet shape indicates that a molten brazing filler metal has penetrated into a space between the ring member 8 and the pad layer 6 with sufficient wettability to thereby improve brazing strength.

Similarly, according to the present embodiment, the first brazing filler portion 10 has a portion 10b which extends toward the radially inner side of the ring member 8 and forms a fillet shape. As a result of the portion 10b also forming a fillet shape, brazing strength is improved.

According to the present embodiment, since the ceramic substrate 4 and the brazing filler flow prevention layers 7a and 7b contain the same material as their main components, adhesion between the ceramic substrate 4 and the brazing filler flow prevention layers 7a and 7b is excellent.

The ceramic-metal structure 100 of the present embodiment can be manufactured, for example, as follows.

First, a first brazing filler metal which is to become the first brazing filler portion 10 is disposed on the pad layer 6 of the ceramic substrate 4, and the ring member 8 is disposed on the first brazing filler metal. Next, in a state in which the metallic body 2 is inserted into the ring member 8 and the through hole 4h of the ceramic substrate 4, the metallic body 2 is held with a jig or the like. Further, a second brazing filler metal which is to become the second brazing filler portion 12 is disposed between the metallic body 2 and the ring member 8.

Then, the resultant assembly is heated so as to melt the first brazing filler metal and the second brazing filler metal at a time for brazing.

The present invention is not limited to the above embodiment, but extends into various modifications and equivalents encompassed by the ideas and scope of the invention.

Figure 3:
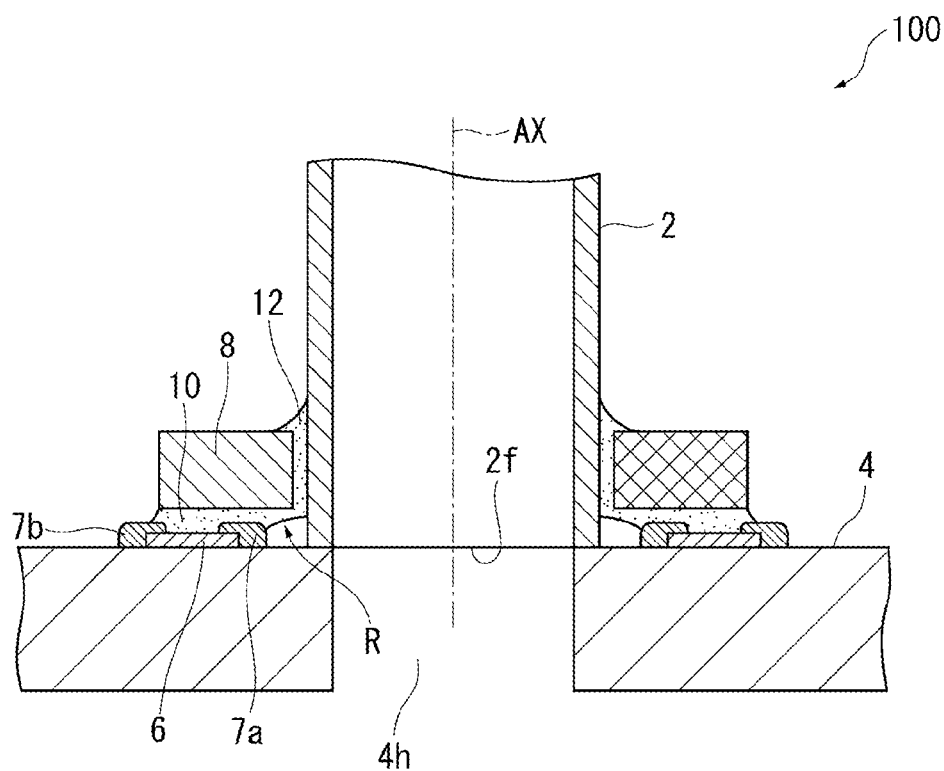
FIG. 3 Sectional view showing a modification of the ceramic-metal structure according to the embodiment of the present invention.

For example, as shown in FIG. 3, the metallic body 2 may be disposed coaxially with the through hole 4h such that an end 2f of the metallic body 2 butts against the surface of the ceramic substrate 4 around the through hole 4h. In the example of FIG. 3, the first brazing filler portion 10 and the second brazing filler portion 12 merge together in a region R located on the radially inner side of the ring member 8. In this case, the "first brazing filler portion 10" is a portion joining the pad layer 6 and the ring member 8 together, and the "second brazing filler portion 12" is a portion joining the ring member 8 and the metallic body 2; however, in the case where the material of the first brazing filler portion 10 is identical with the material of the second brazing filler portion 12, the boundary therebetween may not necessarily be clear.

Figure 4:
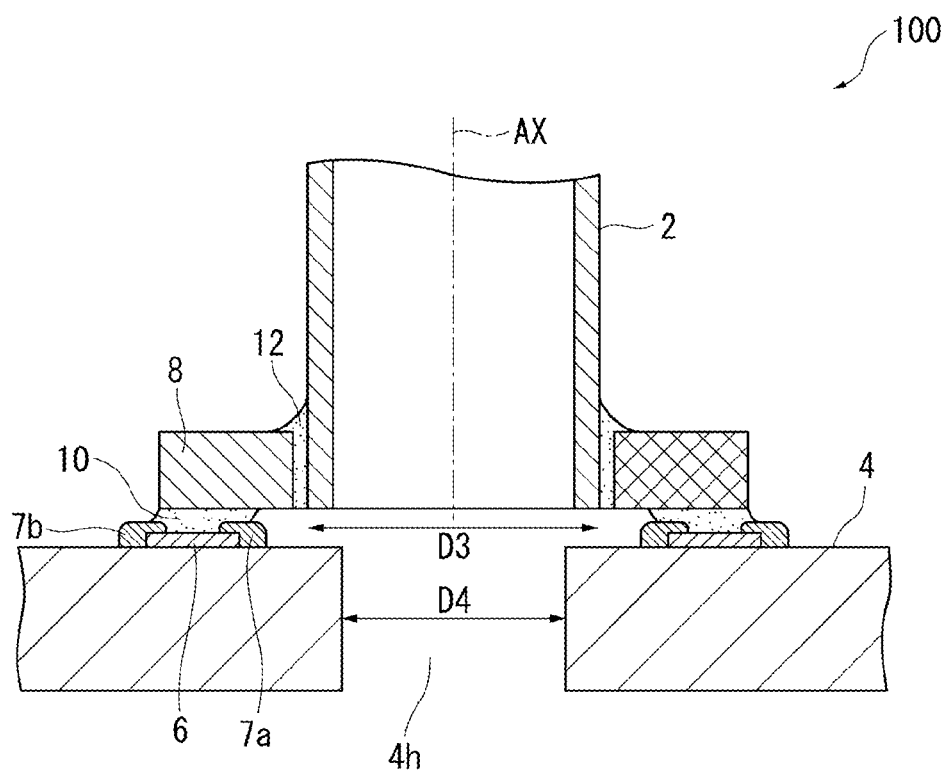
FIG. 4 Sectional view showing another modification of the ceramic-metal structure according to the embodiment of the present invention.

Also, as shown in FIG. 4, an outer diameter D3 of the metallic body 2 may be greater than a diameter D4 of the through hole 4h; thus, the metallic body 2 may be disposed coaxially with the axis AX just above the through hole 4h.

In the above embodiment, the metallic body 2 is pipe-shaped; however, the metallic body 2 may be rod-shaped.

DESCRIPTION OF REFERENCE NUMERALS

2: metallic body
4: ceramic substrate
4c: flow channel
4h: through hole
6: pad layer
6c: central region of pad layer
7a, 7b: brazing filler flow prevention layer
8: ring member
10: first brazing filler portion
10a, 10b: portion in fillet shape
12: second brazing filler portion
100: ceramic-metal structure
AX: axis of through hole
D1: outer diameter of ring member
D2: outer diameter of pad layer
G: gas

The invention claimed is:

1. A ceramic-metal structure in which a pipe-shaped or rod-shaped metallic body is inserted into a through hole extending through a ceramic substrate from a surface of the ceramic substrate in a thickness direction thereof or is coaxially disposed just above the through hole, the ceramic-metal structure comprising:
an annular pad layer made of a metal and disposed on the surface of the ceramic substrate to be located around the through hole;
an annular ring member joined to the pad layer via a first brazing filler portion and having a coefficient of thermal expansion smaller than that of the metallic body;
a second brazing filler portion intervening between the ring member and the metallic body and joining the ring member and the metallic body together; and
a brazing filler flow prevention layer which covers an outer surface of the pad layer in such a manner as to expose a central region of an upper surface of the outer surface of the pad layer, the upper surface facing the first brazing filler portion,
wherein the first brazing filler portion joins the central region and the ring member together without projecting to a radially inner side and a radially outer side of the brazing filler flow prevention layer.

2. A ceramic-metal structure according to claim 1, wherein the ring member has an outer diameter smaller than that of the pad layer, and the first brazing filler portion has a portion which is in contact with a peripheral surface of the ring member and forms a fillet shape.

3. A ceramic-metal structure according to claim 1, wherein the first brazing filler portion has a portion which extends toward a radially inner side of the ring member and forms a fillet shape.

4. A ceramic-metal structure according to claim 1, wherein the ceramic substrate and the brazing filler flow prevention layer contain the same material as their main components.

5. A ceramic-metal structure according to claim 1, wherein the ceramic substrate has a flow channel formed therein which is connected to the through hole and through which gas flows, the metallic body is pipe-shaped, and exchange of gas can be performed between the flow channel and the outside of the ceramic substrate through an internal space of the metallic body.

\* \* \* \* \*